O. EVANS.
Horse Hay Fork.
No. 69,084.          Patented Sept. 24, 1867.
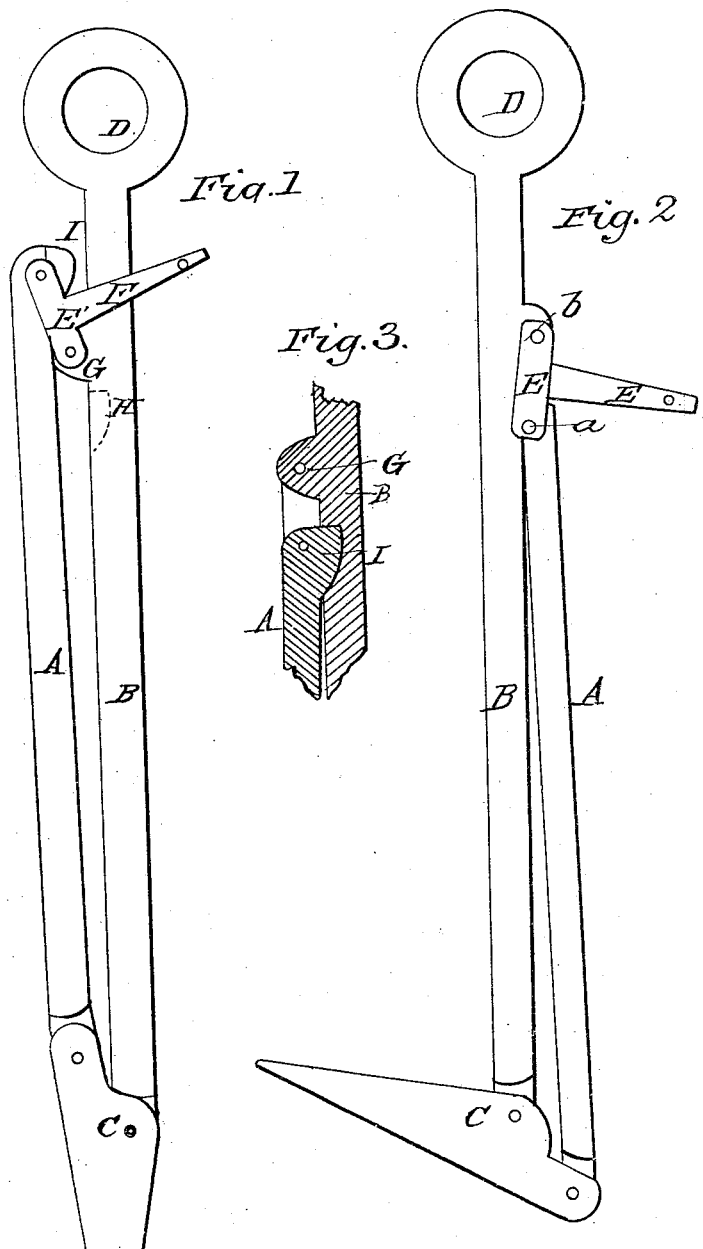

UNITED STATES PATENT OFFICE.

OWEN EVANS, OF ALLIANCE, OHIO.

IMPROVEMENT IN HORSE HAY-FORKS.

Specification forming part of Letters Patent No. 69,084, dated September 24, 1867.

*To all whom it may concern:*

Be it known that I, OWEN EVANS, of Alliance, in the county of Stark and State of Ohio, have invented certain new and useful Improvements in Hay-Forks; and I do hereby declare that the following is a full and complete description of the same, reference being had to the accompanying drawings, making a part of this specification, in which—

Figure 1 is a view of the fork when not loaded; Fig. 2, a view of the fork when loaded; Fig. 3, a detached vertical section.

Like letters of reference refer to like parts in the several views presented.

This fork is constructed in three sections, A, B, and C, Fig. 1, of which B is the main or lifting shaft, to the lower end of which is pivoted the foot C, whereas the upper end terminates in a ring or loop, D, by which it is suspended when in use. To the foot is also pivoted the link A, the upper end of the same being connected to the shaft by the links E, one of which is provided with an arm, F, by which the fork is operated as follows, viz: Immediately under the lug G, to which the links E are attached, and thereby connected to the shaft, is cut a deep mortise or notch, (indicated by the dotted lines H, Fig. 1,) into which the upper end of the link A passes when the implement is in the position shown in Fig. 2. The end of the link, when thus engaged in the mortise, is shown in Fig. 3, in which I is the lip of the link, and B the shaft. It will be readily seen that when the lip of the link is engaged in the shaft, as shown in Fig. 2, the two are not parallel to each other, the lower end of the link being thrown out from the shaft by the heel of the foot, while the upper end is brought close to it, so that the pivoted point $a$ is brought in back of the point $b$, thus throwing the line of draft or leverage to the opposite side from that shown in Fig. 1; hence it will be obvious that the greater the weight or force exerted on the foot when in the position shown in Fig. 2, the stronger will the lip of the link be forced against the end of the mortise, and thus the foot will be prevented from dropping until released by the arm or lever F, which, on being raised upward, forces the lip of the link from the mortise to the opposite side of the fulcrum, when the foot will drop to the position shown in Fig. 1.

The practical operation of the fork is as follows: It is hung to a beam over the load of hay, straw, &c., by means of appropriate pulleys. It is then brought in the position shown in Fig. 1, and the foot thrust into the hay, and when therein it is made to extend laterally, as shown in Fig. 2. The weight of the hay, as the fork is drawn up, causes the lip of the link to hug into the mortise or notch, the hay being carried from the load over to the bay or stack. The fork is then sprung by a cord attached to the lever-link F, which forces the lip out from the mortise to the opposite side of the fulcrum, when the foot drops, and the hay falls into the bay or on the stack. The engagement of the tenon or lip I in the mortise or notch is such that on being released from the mortise it does not abrade on the end of the notch, but comes out without touching, for the reason that the links E slightly depress the link A as they pass the line of draft on the fulcrum; hence the fork will always act with certainty, there being no liability to slip by reason of the two parts wearing so as to render the engagement of the two parts insecure; also, the tripping of the fork is much easier done by thus first depressing the link before the lip is drawn out, as the friction thereby is very much reduced. The armed link only of the links E may be used, if so desired, without interfering with the general action of the fork.

What I claim as my invention, and desire to secure by Letters Patent, is—

The lip I, link E, and T-shaped lever F E', as arranged in combination with the shaft B, provided with notch or mortise H and foot C, for the purpose and in the manner as set forth.

OWEN EVANS.

Witnesses:
W. H. BURRIDGE,
J. H. BURRIDGE.